United States Patent
Shimony

(10) Patent No.: US 10,963,583 B1
(45) Date of Patent: Mar. 30, 2021

(54) AUTOMATIC DETECTION AND PROTECTION AGAINST FILE SYSTEM PRIVILEGE ESCALATION AND MANIPULATION VULNERABILITIES

(71) Applicant: CyberArk Software Ltd., Petach-Tikva (IL)

(72) Inventor: Eran Shimony, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/892,387

(22) Filed: Jun. 4, 2020

(51) Int. Cl.
G06F 21/62 (2013.01)
G06F 21/57 (2013.01)
G06F 21/56 (2013.01)

(52) U.S. Cl.
CPC ........ *G06F 21/6218* (2013.01); *G06F 21/565* (2013.01); *G06F 21/568* (2013.01); *G06F 21/577* (2013.01)

(58) Field of Classification Search
CPC .. G06F 21/6218; G06F 21/565; G06F 21/568; G06F 21/577
See application file for complete search history.

(56) References Cited

U.S. PATENT DOCUMENTS

| | | | | |
|---|---|---|---|---|
| 6,405,316 | B1 * | 6/2002 | Krishnan | G06F 9/44521 713/190 |
| 8,272,058 | B2 * | 9/2012 | Brennan | G06F 21/55 726/24 |
| 9,489,220 | B1 * | 11/2016 | Koryakina | G06F 9/45537 |
| 2002/0162013 | A1 * | 10/2002 | Burnett | G06F 21/6218 726/27 |
| 2008/0022378 | A1 * | 1/2008 | Repasi | G06F 21/51 726/5 |
| 2009/0271863 | A1 * | 10/2009 | Govindavajhala | H04L 63/1433 726/23 |
| 2011/0167260 | A1 * | 7/2011 | Fanton | G06F 21/51 713/165 |
| 2016/0164904 | A1 * | 6/2016 | Alamuri | H04L 63/105 726/25 |
| 2016/0359882 | A1 * | 12/2016 | Touboul | G06F 21/55 |
| 2017/0339178 | A1 * | 11/2017 | Mahaffey | H04L 67/16 |
| 2018/0077195 | A1 * | 3/2018 | Gathala | H04L 63/20 |

OTHER PUBLICATIONS

Wei et al., Security Identifier Randomization: A Method to Prevent Kernel Privilege-Escalation Attacks, Mar. 2016, 30th International Conference on Advanced Information Networking and Applications Workshops, pp. 838-842 (Year: 2016).*

* cited by examiner

*Primary Examiner* — Kenneth W Chang
(74) *Attorney, Agent, or Firm* — Finnegan, Henderson, Farabow, Garrett & Dunner, LLP

(57) ABSTRACT

Disclosed embodiments relate to systems and methods for dynamically identifying potential file system privilege escalation and manipulation vulnerabilities. Techniques include monitoring a file system of a computing system; detecting a privileged file operation involving the file system; determining that a target of the path is writable by a non-privileged identity; and determining whether the target of the path is a dynamic link library. If the target of the path is a dynamic link library, techniques may further include creating a semi-malicious dynamic link library. If the target of the path is not a dynamic link library, techniques may further include creating an object manager symbolic link in a protected file.

20 Claims, 5 Drawing Sheets

AUTOMATIC DETECTION AND PROTECTION AGAINST FILE SYSTEM PRIVILEGE ESCALATION AND MANIPULATION VULNERABILITIES

BACKGROUND

Cybersecurity has increasingly become one of the biggest threats impacting organizations and individuals. While many organizations protect sensitive data and files within a network or computing system, for example by requiring privileged access to the data, these measures are not fail-proof. One common way an attacker may breach such security measures is through privilege escalation, in which the attacker exploits a bug or design flaw in an operating system or application to gain elevated access to restricted resources. For example, in a file system attack, a malicious user may target privileged software that is trusted by an operating system. By exploiting a vulnerability in the system, such as through dynamic link library hijacking or a symlink attack, the malicious user may gain code execution abilities within the privilege level of the trusted software.

Existing techniques, such as antivirus and antimalware tools often cannot protect against such attacks. Because the software is trusted by the operating system it may be very unlikely that the escalated privileges gained through operations performed by the software will be detected. Further, it may be difficult to distinguish between files created by legitimate users and files created by malicious users for the purposes of escalating privileges through a file system attack.

Accordingly, in view of these and other deficiencies in existing techniques, technological solutions are needed for identifying potential file system privilege escalation and manipulation vulnerabilities. Solutions should advantageously allow for dynamic monitoring within a live system environment to detect potential vulnerabilities. Further, technological solutions should be capable of operating at the kernel level of a computing system such that operations may be intercepted before they reach the file system.

SUMMARY

The disclosed embodiments describe non-transitory computer readable media, systems, and methods for securing the use of temporary access tokens in network environments. For example, in an embodiment, a non-transitory computer readable medium may include instructions that, when executed by at least one processor, cause the at least one processor to perform operations for dynamically identifying potential file system privilege escalation and manipulation vulnerabilities. The operations may comprise monitoring a file system of a computing system; detecting a file operation involving the file system, wherein the file operation involves a privileged permission; identifying a target of a path of the file operation; determining that the target of the path is writable by a non-privileged identity; and determining whether the target of the path is a dynamic link library. If the target of the path is a dynamic link library, the operations may include creating a semi-malicious dynamic link library. If the target of the path is not a dynamic link library, the operations may include creating an object manager symbolic link in a protected file.

According to a disclosed embodiment, the operations may be performed by at least one of: an endpoint resource agent or a virtualized computing service.

According to a disclosed embodiment, the operations may further comprise determining whether the file operation followed the symbolic link.

According to a disclosed embodiment, if the file operation followed the symbolic link, the operations may further comprise performing a security control action including at least one of: generating an alert, generating a report, auditing activity based on the file operation, or blocking the file operation.

According to a disclosed embodiment, the operations may further comprise determining whether the file operation loaded the semi-malicious dynamic link library.

According to a disclosed embodiment, if the file operation loaded the semi-malicious dynamic link library, the operations may further comprise performing a security control action including at least one of: generating an alert, generating a report, auditing activity based on the file operation, or blocking the file operation.

According to a disclosed embodiment, the symbolic link may point to a protected target file on the computing system.

According to a disclosed embodiment, the operations may further comprise creating the protected file on the computing system.

According to a disclosed embodiment, the operations may further comprise assigning a name to the protected file on the computing system that is common to at least one other file on the computing system.

According to a disclosed embodiment, the operations may further comprise determining whether the protected target file on the computing system is loaded.

According to another disclosed embodiment, there may be a computer-implemented method for dynamically identifying potential file system privilege escalation and manipulation vulnerabilities. The method may comprise monitoring a file system of a computing system; detecting a file operation involving the file system, wherein the file operation involves a privileged permission; identifying a target of a path of the file operation; determining that the target of the path is writable by a non-privileged identity; and determining whether the target of the path is a dynamic link library. If the target of the path is a dynamic link library, the method may comprise creating a semi-malicious dynamic link library. If the target of the path is not a dynamic link library, the method may comprise creating an object manager symbolic link in a protected file.

According to a disclosed embodiment, the semi-malicious dynamic link library may be created without including malicious code, but instead with code that prompts a security control action if the semi-malicious dynamic link library is loaded.

According to a disclosed embodiment, creating the semi-malicious dynamic link library may include assigning the semi-malicious dynamic link library a name common to at least one other dynamic link library on the computing system.

According to a disclosed embodiment, the method may be performed by a kernel driver.

According to a disclosed embodiment, the method may further comprise creating a honeypot by planting privileged code on the computing system.

According to a disclosed embodiment, the method may further comprise detecting an instance of an identity performing a file operation using the planted privileged code.

According to a disclosed embodiment, the method may further comprise identifying at least one of: the planted privileged code loading the semi-malicious dynamic link library or following the symbolic link.

According to a disclosed embodiment, the method may further comprise auditing activity of the identity involving the planted privileged code.

According to a disclosed embodiment, the method may further comprise identifying an instance of the file operation either loading the semi-malicious dynamic link library or following the symbolic link.

According to a disclosed embodiment, the method may further comprise reporting a vulnerability associated with the identified instance to a software developer.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
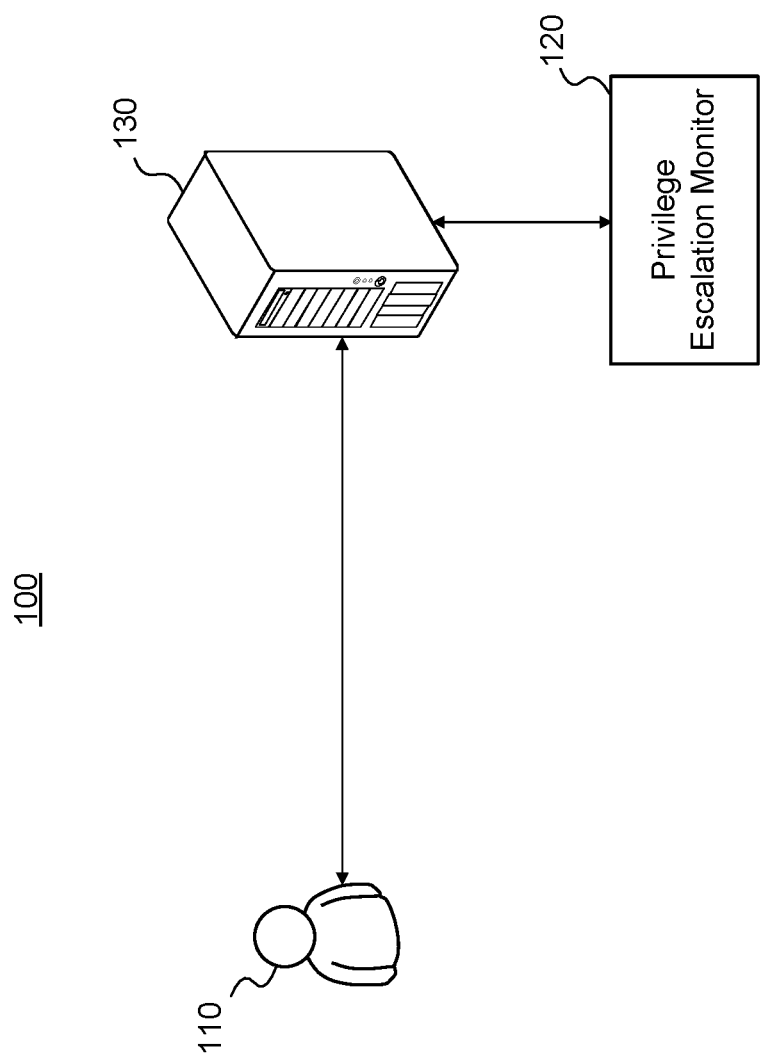
FIG. 1 illustrates an example system environment for monitoring privilege escalation, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for dynamically identifying potential file system privilege escalation and manipulation vulnerabilities described herein overcome several technological problems relating to security, efficiency, and functionality in the fields of cybersecurity and file system operations. The disclosed embodiments provide techniques for monitoring and/or scanning a privileged file system to identify potential vulnerabilities. A privilege escalation monitor, which may be implemented in various forms, may detect file operations within the privileged file system and evaluate whether the file operations present a vulnerability to privilege escalation within the system.

In some embodiments, the privilege escalation monitor may create files within the privileged file system to evaluate potential vulnerabilities. In one example, the privilege escalation monitor may create a dynamic link library (DLL) file to simulate a DLL hijacking or similar attack which may be used by an attacker to escalate privileges within the system. For example, if the target path for a file operation is a DLL, the privilege escalation monitor may create a new DLL, similar to how an attacker may create a malicious DLL to exploit a vulnerability in the system. The privilege escalation monitor may then monitor the file operation to see if the new DLL is loaded instead of the original DLL, which may indicate a privilege escalation vulnerability. Similarly, for non-DLL files the privilege escalation monitor may create symbolic links to simulate a symlink attack that may be used for privilege escalation. For example, a symbolic link may be created having the same name as a target path of a file operation such that a file the new symbolic link is pointing to will be loaded instead of the target. If the symbolic link is followed, a potential privilege escalation vulnerability may be identified.

These techniques may provide valuable insight into potential security vulnerabilities in a protected file system. An alert or report may be generated highlighting any detected vulnerabilities within the system so that an administrator, software developer, or user may address the issues. Further, in some embodiments, the privilege escalation monitor may mitigate some or all of the vulnerabilities, for example by blocking file operations, preventing certain operations (e.g., write or delete operations), or modifying privileges or system configurations associated with the vulnerability. Accordingly, the disclosed techniques may improve security within the computing system and prevent attacks before they occur.

Reference will now be made in detail to the disclosed embodiments, examples of which are illustrated in the accompanying drawings.

FIG. 1 illustrates an example system environment 100 for monitoring privilege escalation, consistent with the disclosed embodiments. System environment 100 may include one or more client identities 110, one or more computing systems 130, and a privilege escalation monitor 120, as shown in FIG. 1. System environment 100 may represent a system or network environment including a file system that is potentially vulnerable to potential privilege escalation and/or manipulation. For example, computing system 130 may contain a protected file system that may be vulnerable to such attacks. Privilege escalation monitor 120 may monitor interactions between client identities 110 and computing system 130 within system environment 100 to detect potential vulnerabilities.

For purposes of simplicity, system environment 100 is shown with the various components in direct communication with each other. It is to be understood, however, that some or all of the components may communicate over a network. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Computing system 130 may be an endpoint resource accessible by client identities 110. Computing system 130 may include any computer-based system or device that includes a file system. For example, computing system 130 may include privileged file system 224, described in greater detail below with respect to FIG. 2. In some embodiments, computing system 130 may include a device, such as a desktop or laptop computer. Computing system 130 may be a server configured to store files accessible through a network (e.g., a web server, application server, virtualized server, etc.). In some embodiments, computing system 130 may be a cloud-based system, such as Dropbox™, Google Docs™, or iCloud™. Computing system 130 may include other devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may include one or more files with privileged access.

Client identities, such as client identity 110, may communicate with and/or interact with computing system 130. As used herein, a client identity 110 may refer to any identity that may access files associated with computing system 130. In some embodiments, client identity 110 may refer to a particular user or account (e.g., data and/or instructions representing an individual or service account). For example, client identity 110 may include a user associated with one or more credentials for accessing a file system associated with computing system 130. In some embodiments, client identity 110 may refer to a device that may access a file system of computing system 130. For example, client identity 110 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may access a file system of computing system 130. In some embodiments, client identity 110 may be a virtual machine (e.g., based on AWS™, Azure™, IBM Cloud™, etc.), container instance (e.g., Docker™ container, Java™ container, Windows Server™ container, etc.), or other virtualized instance. In some embodiments, client identity 110 may be a software instance or application executing on computing system 130.

System environment 100 may also include a privilege escalation monitor 120, as shown in FIG. 1. Privilege escalation monitor 120 may be configured to identify potential vulnerabilities associated with computing system 130. In particular, privilege escalation monitor 120 may be configured to identify individual files within a file system of computing system 130 that may be vulnerable to privilege escalation attacks or similar attacks. In some embodiments, this may comprise monitoring interactions between one or more users (e.g., user 110) and computing system 130 and, based on the interactions, identifying potential vulnerabilities. Privilege escalation monitor 120 may be configured to generate files or modify existing files within computing system 130. In some embodiments, privilege escalation monitor 120 may perform one or more control actions, such as generating alerts, blocking access to one or more files, modifying or deleting files, modifying privilege requirements, or various other control actions. Examples of particular processes that may be performed by privilege escalation monitor 120 are described in greater detail below. While privilege escalation monitor 120 is shown as a separate component in FIG. 1, in some embodiments, privilege escalation monitor 120 may be integral to other components of system environment 100. For example, privilege escalation monitor 120 may be implemented as an agent on computing system 130. Alternatively, or additionally, privilege escalation monitor 120 may be implemented as a virtualized computing service or other remote service. Various example configurations for privilege escalation monitor 120 are provided below.

Figure 2:
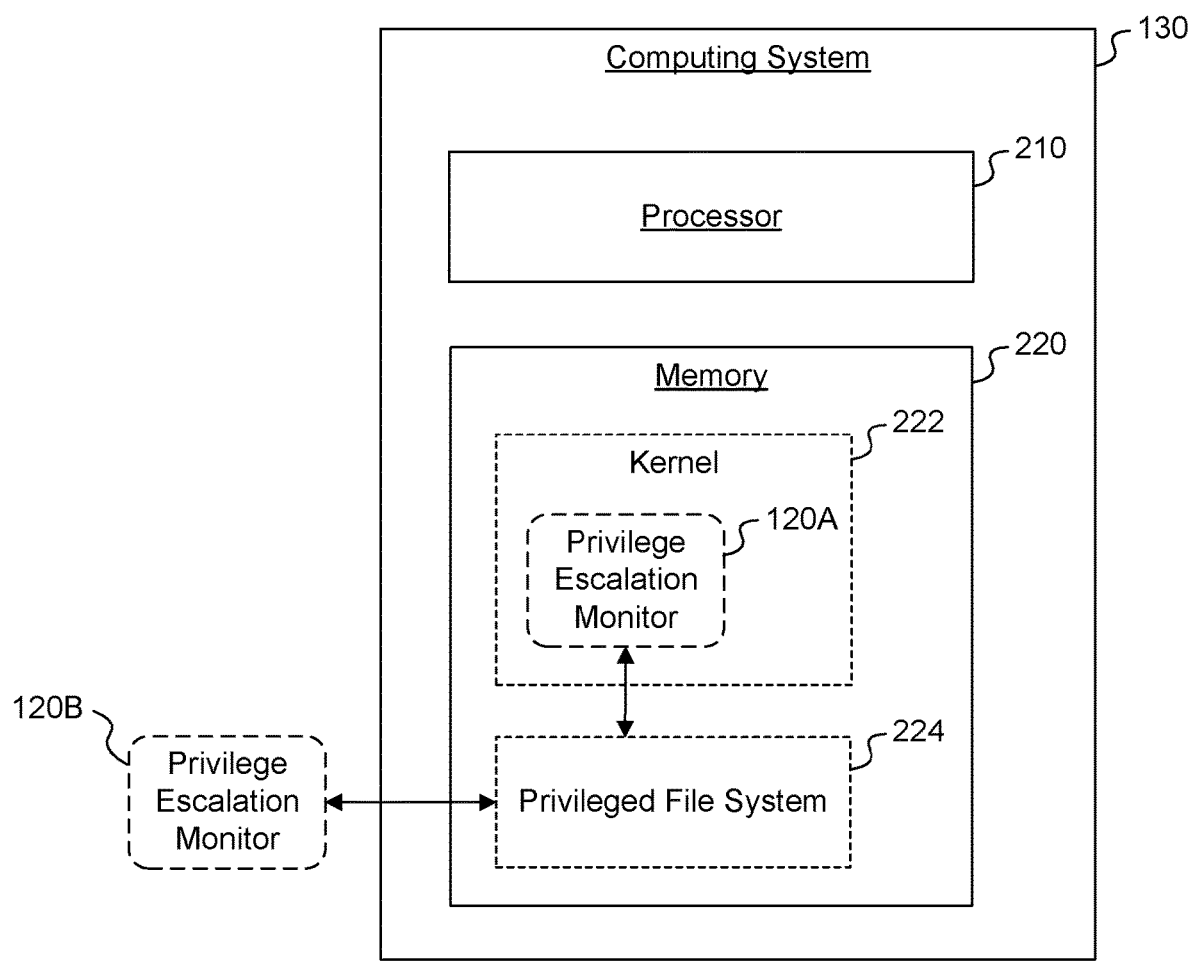
FIG. 2 is a block diagram showing an example computing system, consistent with the disclosed embodiments.

FIG. 2 is a block diagram showing an example computing system 130, consistent with the disclosed embodiments. As described above, computing system 130 may be a computing device (e.g., a server, etc.) and may include one or more dedicated processors and/or memories. For example, computing system 130 may include a processor (or multiple processors) 210 and a memory (or multiple memories) 220, as shown in FIG. 2.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in temporary token system 120.

Memory 220 may include one or more storage devices configured to store instructions used by the processor 210 to perform functions related to computing system 130. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may in some embodiments execute one or more programs (or portions thereof) remotely located from computing system 130. Furthermore, the memory 220 may include one or more storage devices configured to store data for use by the programs. Memory 220 may also include a kernel 222 (e.g., an operating system kernel), which may comprise data loaded in a protected area of memory 220.

Memory 220 may include a privileged file system 224 that may be scanned or monitored by privilege escalation monitor 120. Privileged file system 224 may be any structure or system in which one or more files are stored in memory 220. Files may be stored in privileged file system 224 according to various formats, including Windows™ based systems (e.g., NTFS, FAT32, exFAT, etc.), Apple™ based systems (e.g., APFS, HFS+, HFS), UNIX™ or LINUX™ based systems (e.g., UFS, ext2, ext3, ext4, XFS), or various other systems. Privileged file system 224 may be privileged such that access to one or more files within privileged file system 224 is restricted to users or identities that have been granted access. For example, a client identity 110 may be required to provide credentials (e.g., a username, password, security token, encryption key, biometric data, or other security credentials) in order to access one or more files within privileged file system 224. While privileged file system 224 is shown within the same memory 220 as kernel 222, it is to be understood that privileged file system 224 may be included in a separate memory device, which may include, but is not limited to a separate hard drive, a solid state drive, a CD-ROM drive, a peripheral storage device (e.g., an external hard drive, a USB drive, etc.), a database, a network drive, a cloud storage device, or any other storage device.

Privilege escalation monitor 120 may be configured to detect privilege escalation vulnerabilities within privileged file system 224 according to the various disclosed embodiments. Privilege escalation monitor 120 may be implemented in a variety of ways. In some embodiments, privilege escalation monitor 120 may be implemented as an agent within computing system 120. Accordingly, processor 210 may be configured to perform various functions associated with privilege escalation monitor 120, including process 500 described below. In some embodiments, privilege escalation monitor 120 may be implemented as a kernel driver or kernel module, as shown in FIG. 2. For example, privilege escalation monitor 120 may be implemented as a filter driver or minifilter driver (e.g., through Windows™ Filter Manager) configured to intercept requests directed at privileged file system 224. Accordingly, privilege escalation monitor 120A may monitor activities associated with privileged file system 224 to detect potential vulnerabilities. Privilege escalation monitor 120 may be implemented in various other manners within computing system 130, including as a software agent, a script, or various other forms.

In other embodiments, privilege escalation monitor 120 may be implemented as a standalone system configured to detect potential vulnerabilities in computing system 130, as shown by privilege escalation monitor 120B. Accordingly, privilege escalation monitor 120 may be configured to access one or more files of privileged file system 224 through an external connection, which may include a local connection (e.g., wired, short-range wireless, etc.) or a remote network connection. As one example, privilege escalation monitor 120 may be implemented as a server or device configured to remotely perform a scan of endpoints and/or servers (such as computing system 130) to search for vulnerable software components. The scan may be performed periodically or based on a request (e.g., a request sent by computing system 130, a request from a user, etc.). In some embodiments, privilege escalation monitor 120 may be implemented as a Software as a Service (SaaS). For example, software or other files may be uploaded to privilege escalation monitor 120 to be scanned and analyzed for potential vulnerabilities. Accordingly, privilege escalation monitor 120 may be implemented as a web- or cloud-based service, an on-premises software, as part of a DevOps pipeline, or various other configurations. In some embodiments, privilege escalation monitor 120 may be implemented as an intermediary device (e.g., a proxy server or service) and may be configured to monitor communications between client identity 110 and computing system 130.

FIGS. 3A, 3B, 4A, and 4B illustrate various steps that may be performed by privilege escalation monitor 120 for detecting and protecting against file system privilege escalation vulnerabilities, consistent with the disclosed embodiments. Privilege escalation monitor 120 may be configured to monitor operations performed on individual files of protected file system 224 to detect vulnerabilities. Based on the detected operations, privilege escalation monitor 120 may determine whether the particular file is vulnerable to manipulation, for example, in a privilege escalation attack. Privilege escalation monitor 120 may further be configured to write or generate additional files to detect potential vulnerabilities. Accordingly, privilege escalation monitor 120 may have privileged access to privileged file system 224, including write access. One or more of the steps or functions performed by privilege escalation monitor 120 may depend on a type of file being scanned or monitored. For example, privilege escalation monitor 120 may perform different steps if the file is a dynamic-link library (DLL) file as compared to other types of files.

Figure 3A:
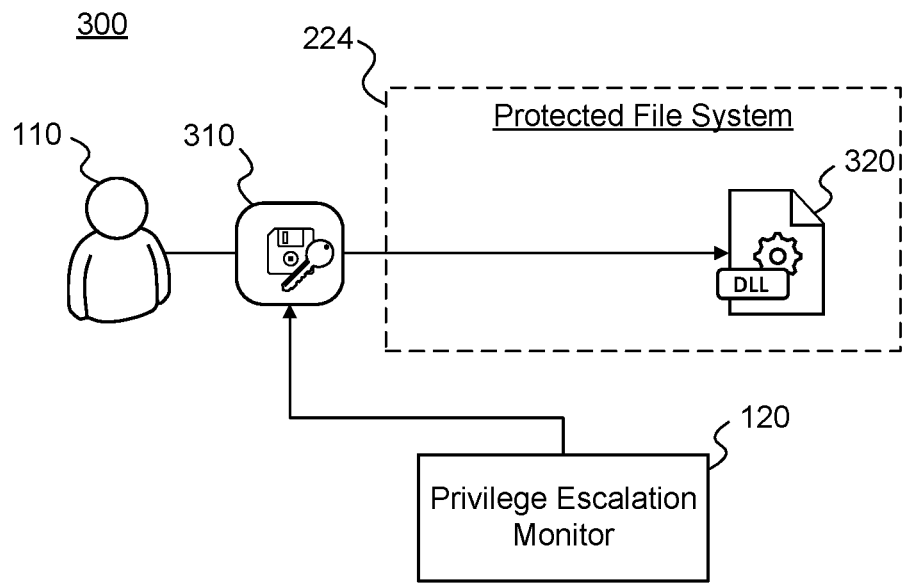
FIGS. 3A and 3B are block diagrams illustrating an example process for detecting file system privilege escalation vulnerabilities associated with a DLL file, consistent with the disclosed embodiments.
Figure 3B:
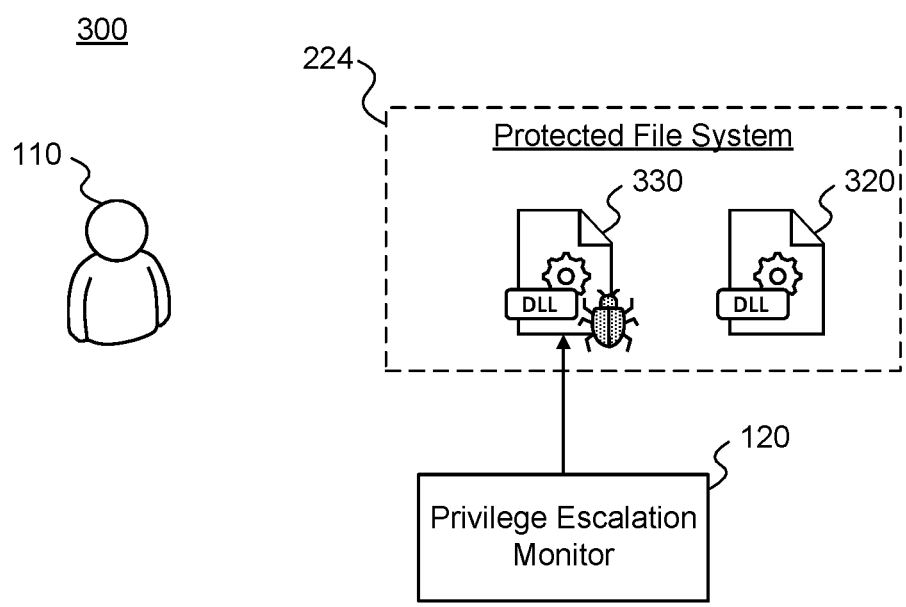

FIGS. 3A and 3B are block diagrams illustrating an example process 300 for detecting file system privilege escalation vulnerabilities associated with a DLL file, consistent with the disclosed embodiments. As described above, privilege escalation monitor 120 may be configured to monitor access to privileged file system 224. For example, client identity 110 may be a privileged user with rights to access privileged file system 224. In some embodiments, client identity 110 may be a privileged software application executing a restricted operation. Privilege escalation monitor 120 may detect a file operation 310 performed by client identity 110, as shown in FIG. 3A. For example, in embodiments where privilege escalation monitor 120 is implemented as a filter driver, privilege escalation monitor 120 may intercept file operation 310 at the kernel level. File operation 310 may be privileged and thus may require client identity 110 to have rights to perform file operation 310.

Privilege escalation monitor 120 may be configured to determine whether a target path of file operation 310 (in this case, DLL file 320) is writable by a non-administrative user. In some embodiments, this may include accessing a privilege policy associated with protected file system 224 that may define privilege levels and/or roles associated with various actions that may be performed on various targets within file system 224. For example, the privilege policy may define the level of privilege required for write access to DLL file 320. If the target path of file operation 310 is not writable by a non-administrative user, the target path may not present a significant risk of privilege escalation or manipulation. For example, an attacker trying to escalate his or her privileges within system environment 100 may not be able to gain administrative privileges through the target path of file operation 310. Accordingly, privilege escalation monitor 120 may not proceed further in process 300.

In the context of the present disclosure, the level of privilege required for a user to be considered an administrative user may vary. An administrative user may be any user having access rights that exceed a threshold level of access rights (e.g., those of a standard user). In some embodiments, the threshold may coincide with privileges associated with an administrator role defined by an operating system or software component of computing system 130. For example, if computing system 130 is a Windows™ based system, privilege escalation monitor 120 may determine whether the target file is accessible by an administrator account. In other embodiments, the threshold level may be defined by privilege escalation monitor 120 and may not necessarily coincide with the definition of an administrator as used by computing system 130. For example, privilege escalation monitor 120 may determine whether a user is considered an administrative user based on whether the user has a number of specific privileges considered to pose a threat for privilege escalation, such as the ability to modify privileges for other users, the ability to make system changes, etc. In some embodiments, privilege escalation monitor 120 may be configured such that the level of privileges considered to be "administrative" is to be customized by a user of privilege escalation monitor 120.

If the target of file operation 310 is determined to be writable by a non-administrative user, privilege escalation monitor 120 may determine whether the target path is a DLL. As used herein, a DLL may refer to any software module or library that contains a set of code and/or data for carrying out a particular activity. The DLL may be used by other modules or applications for carrying out the particular activity. While the term "DLL" is used throughout, it is to be understood that this is by way of example only. For example, DLL file 320 may be another form of shared object file or similar type of file (e.g., a .so file in a Linux system, a .jar file in Java, etc.). In the example shown in FIG. 3A, privilege escalation monitor 120 may determine that DLL file 320 is the target of file operation 310.

Based on this determination, privilege escalation monitor 120 may create a semi-malicious DLL 330, as shown in FIG. 3B. As used herein, a semi-malicious file may refer to a file containing code intended to perform a function outside the normal intended use of the computing system 130. Semi-malicious DLL 330 may contain code that at least partially simulates a DLL file that may be used by an attacker for privilege escalation or manipulation. For example, semi-malicious DLL 330 may simulate a DLL file placed by an attacker to be loaded instead of DLL file 320 to escalate the privileges of the attacker to the level of an identity performing file operation 310. In some embodiments, semi-malicious DLL 330 may have a name common to another DLL, such as DLL file 320. Accordingly, semi-malicious DLL 330 may be loaded in place of DLL file 320 when DLL file 320 is requested in an operation on computing system 130.

Privilege escalation monitor 120 may then monitor semi-malicious DLL 330 to determine whether file operation 310 loads semi-malicious DLL 330, which may indicate that DLL file 320 or file operation 310 represents a vulnerability to privilege escalation attacks. Accordingly, privilege escalation monitor 120 may perform one or more control actions. In some embodiments, privilege escalation monitor 120 may generate an alert to notify an administrator or other user of the potential vulnerability. The alert may indicate the detected file associated with the vulnerability (e.g., DLL file 320), information associated with file operation 310 (e.g., a time of the operation, a type of operation, the identity of the user performing the operation, etc.), or similar information. In some embodiments, privilege escalation monitor 120 may be configured to generate a report, which may include the information described above with respect to the notification as well as other information, such as other detected vulnerabilities. For example, the report may be a list of all potential vulnerabilities identified during a scan of privileged file system 224. The report may be a one-time report generated as part of a service, or may be a recurring report (e.g., generated on an hourly, daily, monthly, yearly, upon completion of a scheduled scan, or another periodic basis). In some embodiments, the report may be transmitted to a software developer (e.g., developer of DLL 320, file operation 310, etc.), so that potential vulnerabilities exposed by semi-malicious DLL 330 can be addressed through a software update, fix, upgrade, etc.

In some embodiments, privilege escalation monitor 120 may be configured to audit activity based on file operation 310. For example, privilege escalation monitor 120 may monitor other operations performed by client identity 110, other files targeted in file operation 310, file operations sharing one or more attributes with file operation 310, activity in which DLL file 320 is the target path, or other activity associated with file operation 310. Privilege escalation monitor 120 may determine whether the monitored activity is indicative of privilege escalation attack or privilege escalation vulnerability. In some embodiments, privilege escalation monitor 120 may block and/or disable file operation 310 such that it may not be completed by client identity 110. Privilege escalation monitor 120 may further block other file operations on DLL file 320. The control actions may include other actions, such as modifying a privilege policy associated with DLL file 320 (e.g., increasing the privilege requirements to write to the file, etc.), deleting DLL file 320, or the like.

In some embodiments, semi-malicious DLL 330 may not contain malicious code but may instead contain code that prompts a security control action if semi-malicious DLL 330 is loaded. For example, loading semi-malicious DLL 330 may trigger a notification to privilege escalation monitor 120 that the file as been loaded. In some embodiments, semi-malicious DLL 330 may contain code for automatically performing one of the security control actions described above. While process 300 is described above with respect to DLL files, it is to be understood that the same or similar processes may be performed with other file types.

Figure 4A:
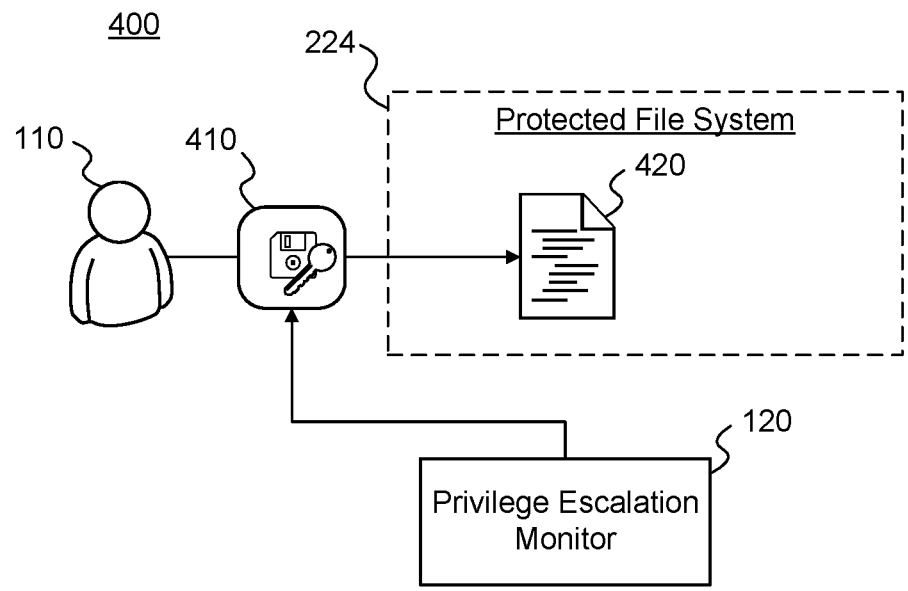
FIGS. 4A and 4B are block diagrams illustrating an example process for detecting file system privilege escalation vulnerabilities associated with a non-DLL file, consistent with the disclosed embodiments.
Figure 4B:
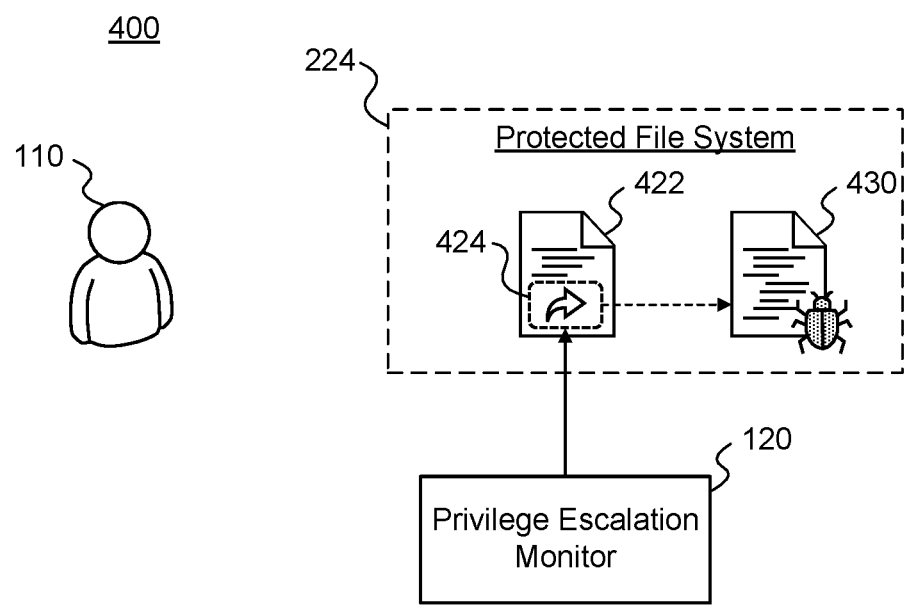

As indicated above, in some embodiments, privilege escalation monitor 120 may perform at least partially different operations when the target of a file operation is not a DLL file. For example, rather than creating a DLL file, privilege escalation monitor 120 may create a link or other code to explore potential vulnerabilities. FIGS. 4A and 4B are block diagrams illustrating an example process 400 for detecting file system privilege escalation vulnerabilities associated with a non-DLL file, consistent with the disclosed embodiments. Similar to process 300, privilege escalation monitor 120 may detect a file operation 410 performed by client identity 110, as shown in FIG. 4A. File operation 410 may be privileged and thus may require client identity 110 to have rights to perform file operation 410.

As described in greater detail above, privilege escalation monitor 120 may determine whether a target path of file operation 410 is writable by a non-administrative user. Assuming the target path is writable by a non-administrative user, privilege escalation monitor 120 may determine whether the target path of file operation 410 is a DLL file. In the example shown in FIG. 4A, the target path may be a file 420, which may be of a type other than a DLL. This may include any type of data file that may be stored in a file system.

Based on a determination that file 420 is not a DLL, privilege escalation monitor 120 may be configured to create a symbolic link in a protected file. For example, privilege escalation monitor 120 may create symbolic link 424 in protected file 422, as shown in FIG. 4B. As used herein, a symbolic link 424 (or symlink) may refer to any file that contains a reference to another file or directory in the form of an absolute or relative path. For example, symbolic link 424 may be a Windows'™ Object Manager symbolic link or other similar form of symbolic link.

In some embodiments, protected file 422 may be file 420. For example, privilege escalation monitor 120 may insert symbolic link 424 into file 420. In other embodiments, privilege escalation monitor 120 may create a new file corresponding to protected file 422 and may insert symbolic link 424 into the new file. In some embodiments, privilege escalation monitor 120 may assign a name to protected file 422 that is common to at least one other file on the computing system 130. For example, protected file 422 may share the same name as file 420. Similarly, symbolic link 424 may be assigned a name that is common to a target path of file 420. Accordingly, when file operation 410 is performed, rather than targeting file 420, file operation 410 will be directed to the target of symbolic link 424 (e.g., protected file 430).

Privilege escalation monitor 120 may be configured to determine whether file operation 410 followed symbolic link 424, which may indicate that file 420 represents a potential privilege escalation vulnerability within computing system 130. The creation of symbolic link 424 may simulate a symbolic link or symlink attack that may be performed on computing system 130. For example, an attacker may create a symbolic link that may target a critical file within privileged file system 224. A privileged application performing a file operation on file 420 may be directed to perform the operation on the critical file through the symbolic link. Accordingly, successful exploitation of this vulnerability may result in privilege escalation for the attacker.

If privilege escalation monitor 120 determines that file operation 410 follows the symbolic link 424, it may perform one or more security control actions. The security control actions may be the same as those described above with respect to process 300. For example, the control actions my include generating an alert, generating a report, auditing activity based on the file operation, blocking the file operation, modifying a privilege policy, deleting file 420, or the like. In some embodiments, a report of the vulnerability may be provided to a software developer (e.g., developer of file 420, operation 410, etc.) so that the vulnerability can be ameliorated.

In some embodiments, symbolic link 424 may point to a protected file 430 within file system 224. In some embodiments, privilege escalation monitor 120 may create protected file 430. Similar to with DLL 330, privilege escalation monitor 120 may determine whether file 420 represents a potential privilege escalation vulnerability based on protected file 430. For example, privilege escalation monitor 120 may determine whether protected file 430 is loaded into a process during file operation 410, which may indicate a potential symlink attack privilege escalation vulnerability within computing system 130, as described above. In some embodiments, protected file 430 may contain code for automatically performing one or more security control actions, similar to semi-malicious DLL 330, as described above.

In some embodiments, the steps described in processes 300 and 400 may be performed by an agent or virtualized computing service, as described above. For example, privilege escalation monitor 120 may be implemented as a kernel driver or kernel module in computing system 130 or may be implemented as a SaaS. Various other implementations of processes 300 and 400, or portions or variations thereof, may be performed.

For example, in some embodiments, privilege escalation monitor 120 may create a honeypot for detecting potential malicious activity. For example, privilege escalation monitor 120 may plant vulnerable privileged code and may monitor the code to track potential malicious actions. This may involve creating a honeypot within privileged file system 224 by planting privileged code on computing system 130. The privileged code may be susceptible to attacks using DLL files or symbolic links as described above. Privilege escalation monitor 120 may then monitor the planted privileged code to detect an instance of an identity performing a file operation using the planted privilege code. If the planted privilege code loads either DLL 330 or follows symbolic link 424, this may indicate that the identity is a malicious identity (e.g., malware, an attacker, etc.). Accordingly, privilege escalation monitor 120 may be configured to perform a security control action, which may include generating an alert, or any of the other security control actions described above. In some embodiments, privilege escalation monitor 120 may audit the activity of the identity involving the planted privilege code. This may include determining whether the identity has successfully escalated privileges, identifying other privilege code the identity may attempt to exploit, determining an identifier or other information associated with the identity, or similar actions.

In some embodiments, privilege escalation monitor 120 may be implemented as part of a software development process (e.g., in a DevOps pipeline, etc.). Accordingly, privilege escalation monitor 120 may identify potential vulnerabilities in software code as it is being developed. For example, privilege escalation monitor 120 may identify an instance of a file operation either loading semi-malicious DLL 330 or following symbolic link 424 and may report the vulnerability to a software developer. In some embodiments, privilege escalation monitor 120 may be implemented as part of a vulnerability research service. For example, privilege escalation monitor 120 may be utilized in a lab environment to detect potential vulnerabilities in software-based products. When vulnerabilities are detected, a vendor of the software product may be notified so that they may address the vulnerabilities and report them, for example as part of a responsible disclosure model. Accordingly, privilege escalation monitor 120 may be used as part of a public relations (PR) model or service.

Figure 5:
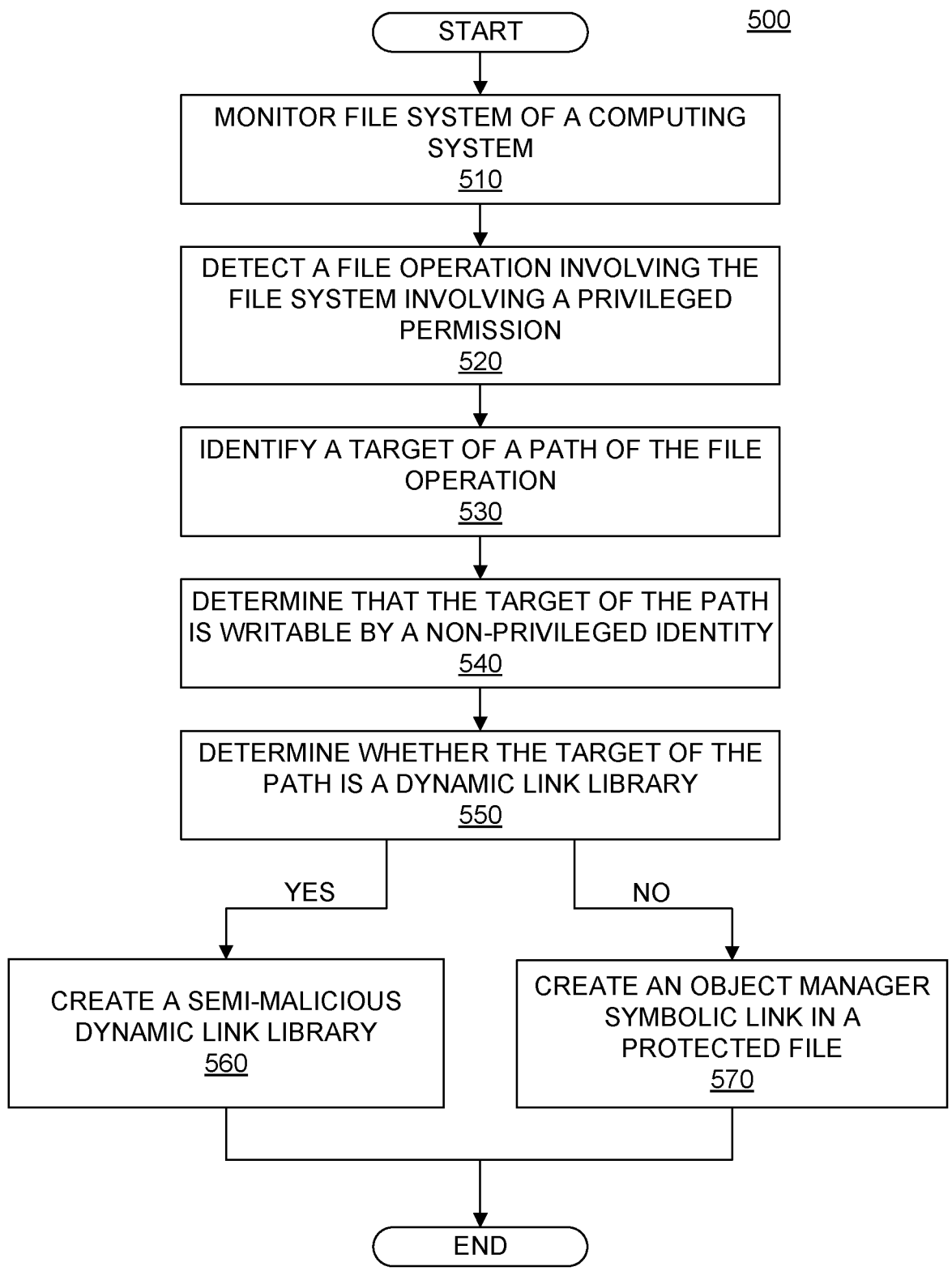
FIG. 5 is a flowchart depicting an example process for dynamically identifying potential file system privilege escalation and manipulation vulnerabilities, consistent with the disclosed embodiments.

FIG. 5 is a flowchart depicting an example process 500 for dynamically identifying potential file system privilege escalation and manipulation vulnerabilities, consistent with the disclosed embodiments. Process 500 may be performed by at least one processing device, such as processor 210, as described above. For example, where privilege escalation monitor 120 is implemented as an agent within computing system 130, some or all of the steps of process 500 may be performed by processor 210. In some embodiments, some or all of process 500 may be performed by a kernel driver, as described above.

In other embodiments, for example, where privilege escalation monitor 120 is implemented as a web-based service, a remote device or server, a SaaS product, or other remote services, privilege escalation monitor 120 may have one or more dedicated processing devices configured to perform some or all of process 500. It is to be understood that throughout this disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 500. Process 500 is not necessarily limited to the steps shown in FIG. 5, and any steps or processes of the various embodiments described throughout the present disclosure may also be included in process 500, including those described above with respect to processes 300 and 400.

At step 510, process 500 may include monitoring a file system of a computing system. For example, privilege escalation monitor 120 may monitor file system 224 of computing system 130, as described above. At step 520, process 500 may include detecting a file operation involving file system 224. For example, privilege escalation monitor 120 may detect file operation 310 or 410, described in greater detail above. The file operation may be a privileged file operation, and thus may involve a privileged permission. For example, an identity performing file operation 310 or 410 may require at token or other credentials to perform the file operation. In some embodiments, the file operation may be performed (or requested) by a privileged application.

At step 530, process 500 may include identifying a target of a path of file operation 224. For example, this may include examining code associated with the file operation to determine a target path of the operation. At step 540, process 500 may include determining that the target of the path is writable by a non-privileged (e.g., a non-administrative) identity. As described above, if the target is not writable by a non-privileged identity, the file operation may not represent a significant risk for privilege escalation. Conversely, if the target of the path is writable by a non-privileged identity it may represent a potential privilege escalation vulnerability. At step 550, process 500 may include determining whether the target of the path (e.g., either DLL file 320 or file 420, described above) is a dynamic link library. This may comprise analyzing a filename or other properties of the target, or properties of the file operation.

If the target of the path is determined in step 550 to be a dynamic link library, at step 560, process 500 may include creating a semi-malicious dynamic link library. For example, step 560 may include creating semi-malicious DLL 330, as described above with respect to process 300. In some embodiments, creating the semi-malicious dynamic link library may include assigning the semi-malicious dynamic link library 330 a name common to at least one other dynamic link library on the computing system. For example, step 560 may include assigning a name to semi-malicious DLL 330 that is the same as a name of DLL file 320. Accordingly, file operation 310, when executed, may load semi-malicious DLL 330 rather than DLL file 320.

Process 500 may include additional steps based on creation of semi-malicious DLL 330. For example, process 500 may further comprise determining whether file operation 310 loaded semi-malicious DLL 330. This may be performed, for example, by monitoring or tracking file operation 310 or semi-malicious DLL 330. If file operation 310 loaded the semi-malicious dynamic link library 330, this may indicate that file operation 310 and/or DLL file 320 represent a potential vulnerability for privilege escalation. Accordingly, process 500 may further comprise performing a security control action. As described above, the security control action may include generating an alert, generating a report, auditing activity based on file operation 310, or blocking file operation 310. In some embodiments, semi-malicious DLL 330 may be configured to trigger the security control action. For example, semi-malicious DLL 330 may be created without including malicious code, but instead with code that prompts a security control action if the semi-malicious dynamic link library is loaded.

Alternatively, if the target of the path is not a dynamic link library, process 500 may include creating an object manager symbolic link in a protected file at step 570. For example, step 570 may include generating symbolic link 424 in protected file 422, as described above. As described above, process 500 may further include determining whether file operation 410 followed symbolic link 424. In such instances, process 500 may include performing a security control action, such as generating an alert, generating a report, auditing activity based on the file operation, and/or blocking the file operation.

In some embodiments, symbolic link 424 may point to a protected file on computing system 130. For example, symbolic link 424 may point to protected file 430, as described above. In some embodiments, step 570 may further comprise creating protected file 430 on computing system 130. Step 570 may comprise assigning a name to the protected file 430 on the computing system 130 that is common to at least one other file on the computing system, as described above. In some embodiments, process 500 may further include determining whether the protected file on the computing system is loaded.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically identifying potential file system privilege escalation and manipulation vulnerabilities, the operations comprising:
   monitoring a file system of a computing system;
   detecting, at a kernel level of the computing system, a file operation involving the file system, wherein the file operation involves a privileged permission;
   identifying a target of a path of the file operation;

determining that the target of the path is writable by a non-privileged identity;
determining whether the target of the path is a dynamic link library;
performing at least one of:
   if the target of the path is a dynamic link library, creating a semi-malicious dynamic link library, or
   if the target of the path is not a dynamic link library, creating an object manager symbolic link in a protected file; and
identifying a potential privilege escalation vulnerability in the computing system based on whether the file operation loads the semi-malicious dynamic link library or follows the symbolic link.

2. The non-transitory computer readable medium of claim 1, wherein the operations are performed by at least one of: an endpoint resource agent or a virtualized computing service.

3. The non-transitory computer readable medium of claim 1, wherein the operations further comprise determining whether the file operation followed the symbolic link.

4. The non-transitory computer readable medium of claim 3, wherein if the file operation followed the symbolic link, the operations further comprise performing a security control action including at least one of: generating an alert, generating a report, auditing activity based on the file operation, or blocking the file operation.

5. The non-transitory computer readable medium of claim 1, wherein the operations further comprise determining whether the file operation loaded the semi-malicious dynamic link library.

6. The non-transitory computer readable medium of claim 5, wherein if the file operation loaded the semi-malicious dynamic link library, the operations further comprise performing a security control action including at least one of: generating an alert, generating a report, auditing activity based on the file operation, or blocking the file operation.

7. The non-transitory computer readable medium of claim 1, wherein the symbolic link points to a protected target file on the computing system.

8. The non-transitory computer readable medium of claim 7, wherein the operations further comprise creating the protected file on the computing system.

9. The non-transitory computer readable medium of claim 8, wherein the operations further comprise assigning a name to the protected file on the computing system that is common to at least one other file on the computing system.

10. The non-transitory computer readable medium of claim 8, wherein the operations further comprise determining whether the protected target file on the computing system is loaded.

11. A computer-implemented method for dynamically identifying potential file system privilege escalation and manipulation vulnerabilities, the method comprising:
monitoring a file system of a computing system;
detecting, at a kernel level of the computing system, a file operation involving the file system, wherein the file operation involves a privileged permission;
identifying a target of a path of the file operation;
determining that the target of the path is writable by a non-privileged identity;
determining whether the target of the path is a dynamic link library; and
performing at least one of:
   if the target of the path is a dynamic link library, creating a semi-malicious dynamic link library, or
   if the target of the path is not a dynamic link library, creating an object manager symbolic link in a protected file; and
identifying a potential privilege escalation vulnerability in the computing system based on whether the file operation loads the semi-malicious dynamic link library or follows the symbolic link.

12. The computer-implemented method of claim 11, wherein the semi-malicious dynamic link library is created without including malicious code, but instead with code that prompts a security control action if the semi-malicious dynamic link library is loaded.

13. The computer-implemented method of claim 11, wherein creating the semi-malicious dynamic link library includes assigning the semi-malicious dynamic link library a name common to at least one other dynamic link library on the computing system.

14. The computer-implemented method of claim 11, wherein the method is performed by a kernel driver.

15. The computer-implemented method of claim 11, further comprising creating a honeypot by planting privileged code on the computing system.

16. The computer-implemented method of claim 15, further comprising detecting an instance of an identity performing a file operation using the planted privileged code.

17. The computer-implemented method of claim 16, further comprising identifying at least one of: the planted privileged code loading the semi-malicious dynamic link library or following the symbolic link.

18. The computer-implemented method of claim 17, further comprising auditing activity of the identity involving the planted privileged code.

19. The computer-implemented method of claim 11, further comprising identifying an instance of the file operation either loading the semi-malicious dynamic link library or following the symbolic link.

20. The computer-implemented method of claim 19, further comprising reporting a vulnerability associated with the identified instance to a software developer.

* * * * *